United States Patent [19]
Lakhansingh

[11] Patent Number: 6,041,023

[45] Date of Patent: Mar. 21, 2000

[54] PORTABLE DIGITAL RADIO AND COMPACT DISK PLAYER

[76] Inventor: Cynthia Lakhansingh, 401 W. 47th St., Apt 12, New York, N.Y. 10036

[21] Appl. No.: 09/280,238

[22] Filed: Mar. 29, 1999

[51] Int. Cl.[7] .................................................... H04H 9/00
[52] U.S. Cl. .................................................... 369/7; 369/2
[58] Field of Search ............................... 369/2, 7, 6, 84, 369/83, 5, 15, 85; 445/344, 345, 33.1

[56] References Cited

U.S. PATENT DOCUMENTS

| | | | |
|---|---|---|---|
| 4,805,217 | 2/1989 | Morihiro et al. | 704/211 |
| 5,561,849 | 10/1996 | Mankovitz | 445/45 |
| 5,761,159 | 6/1998 | Ashenafi | 369/2 |

*Primary Examiner*—Ali Neyzari
*Attorney, Agent, or Firm*—Gene Scott-Patent Law Venture Group

[57] ABSTRACT

A combination radio receiver and compact disk player is enabled also for writing onto a compact disk or other permanent storage medium. A touch sense screen is used to display and select menu graphics choices such as to listen to the radio or a CD, save selections, etc. The apparatus provides a display of all selections stored in its memory so that one may choose favorite music selections and their order of play.

7 Claims, 4 Drawing Sheets

PORTABLE DIGITAL RADIO AND COMPACT DISK PLAYER

This application is based upon a previously filed document disclosure filed with the United States Patent Office, having Ser. No. 443,727 and an assigned filing date of Aug. 20, 1998 and which contains subject matter substantially the same as the present application.

BACKGROUND OF THE INVENTION

1. Field of the Invention

This invention relates generally to portable personal entertainment devices, and more particularly to a portable radio with compact disk player with a computer-like interface, having novel benefits and advantages.

2. Description of Related Art

The following art defines the present state of this field:

Hale, U.S. Pat. No. 4,713,801 describes an audio device for automotive use in which radio transmissions can be received and directly recorded on magnetic tapes, cassettes or discs. The device includes an in-dash combination AM-FM radio receiver and tape or cassette deck, which is specially adapted to permit, direct recording of radio transmissions on blank tape cartridges or cassettes.

Weitz et al., U.S. Pat. No. 4,937,807 describes a method and apparatus for addressable digital representations of high-fidelity sound recordings in a non-mapped digital storage device, such as a CD music ROM, using conventional PCM (pulse code modulated) equipment, but in a more condensed and efficiently sampled ADM (adaptive delta modulated) format thereby providing high-density addressable storage of several thousand recordings in a single music ROM jukebox as well as high-speed information transfers. The invention enables communication and control links between conventional digital audio processor and conventional microcomputers. Timing data in embedded in the ADM formatted and blocked data file. The microcomputer is utilized for editing ADM data, inserting catalog data, and transferring the data file to a standard PCM file writer suitable for making non-mapped CD music ROMs containing addressable ADM data files on conventional equipment utilized in the industry. Encoding is performed by Dolby delta-link ADM encoding to achieve time-domain condensation of information content and analog signals representing the sound recording reduction techniques. CD music ROMs produced thereby are utilized in high-speed reproduction systems or for addressable computer access in high-volume archival storage systems.

Gantt, U.S. Pat. No. 5,633,837 describes an automobile recorder allowing a user to continuously record the contents of radio programs onto a solid state memory and then transfer selected portions to a cassette tape or recorded compact disk. The auto recorder prevents unnecessary wear on the tape mechanism and tape by requiring use of these only when the tape transfer made out tape is being played back. A second optional AM/FM tuner allows the user to listen to one program while recording another program onto the solid state memory.

Okada, U.S. Pat. Nos. 5,568,453 and 5,448,534 both describe a radio system having a detector for detecting a required radio program, and supplying an instruction signal when the program is detected. In accordance with the instruction signal, a recording unit begins to record the program.

Masaaru, U.S. Pat. No. 5,235,568 describes a combined system for commonly controlling a compact disk changer player and a radio receiver having a plurality of memory/call switches for selectively operating the compact disk changer player and the radio receiver under the control of a microcomputer; and a radio/compact disk changeover switch, for selectively playing back a user's desired disk and track. In the control method of the combined system for commonly controlling the compact disk changer player and the radio receiver, the first and second inputs of the memory/call switches coincide with a ten's place number corresponding to a track number receptively and a radio frequency changeover data is generated to operate the radio receiver when the radio/compact disk changeover switch is switched to the radio receiver, while a disk number changeover data are generated to operate the compact disk changer player when the radio/compact disk changeover switch is switched to the compact disk.

Yifrach, U.S. Pat. No. 5,126,982 describes a buffer system for radio receivers includes a cyclic storage device connectable to a demodulator circuit for continuously storing the audio signals last outputted thereby only over a predetermined time interval, enabling the listener to jump-back to hear a preceding portion of the radio broadcasts. In one described embodiment, the listener normally hears the broadcasts in a real-time manner but may depress a button to hear the broadcasts in delayed-time manner via the cyclic storage device. In a second described embodiment, the listener normally hears the broadcasts in a real-time manner, and may depress a button to freeze a part of the broadcast in another storage device, and may later depress another button to play back the portion frozen.

Kato et al., U.S. Pat. No. 5,195,065 describes a function setting method for an audio system which is capable of changing a function of the audio system which is capable of changing a function of the audio system without alteration of the hardware of a system controller and is superior in general use. The method comprises the steps of preparing, as the system controller for controlling functions incorporated in the audio system in a concentrated manner, a microcomputer which has an analog/digital conversation input port and has built therein control programs for all of a plurality of functions which can be incorporated in the audio system, and applying a selected one of a plurality of analog voltages which individually represents possible combinations of the functions including the individual functions to the analog/digital conversation input port of the microcomputer to cause the microcomputer to be prepared for one or ones of the functions represented by the analog voltage.

The prior art teaches the use of devices for storing and playback of digitally processed information. However, the prior art does not teach that a combination radio and compact disk entertainment device may be controlled with a screen displayed menu program for playing, storing, editing, archiving and retrieving audio and video information. The present invention fulfills these needs and provides further related advantages as described in the following summary.

SUMMARY OF THE INVENTION

The present invention teaches certain benefits in construction and use which give rise to the objectives described below.

The present invention provides a combination radio receiver and compact disk player enabled for writing onto a compact disk or other permanent storage medium. A touch sense screen is used to display and select most choices, but mode selection such as AM radio band, FM radio band, and CD, is accomplished by using a multifunction mechanical switch located on the case of the apparatus. Volume control is also a mechanical control; a finger adjustable knob. The apparatus provides a display of all selections stored in its memory so that one may choose favorite music selections and their order of play.

A primary objective of the present invention is to provide a portable entertainment center having advantages not taught by the prior art.

Another objective is to provide such an entertainment center capable of recording selections from radio broadcasts as well as tracks from commercial CD devices.

A further objective is to provide such an entertainment center having portability so as to be easily moved from place to place.

A still further objective is to provide such an entertainment center having a touch sense monitor display capable of displaying the contents of the stored memory so as to select music and other material for entertainment.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
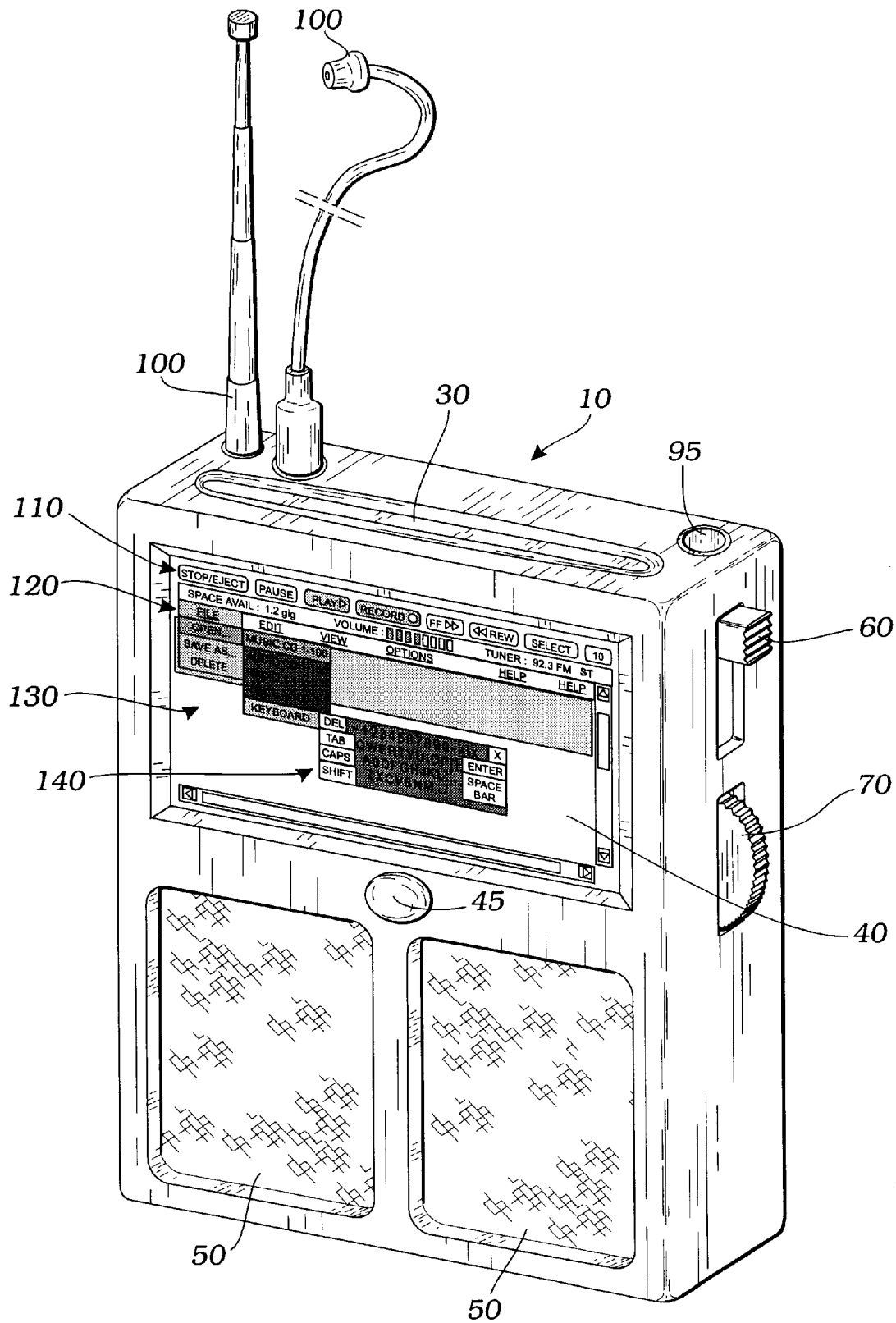
FIG. 1 is a perspective view of the preferred embodiment of the present invention.
Figure 2:
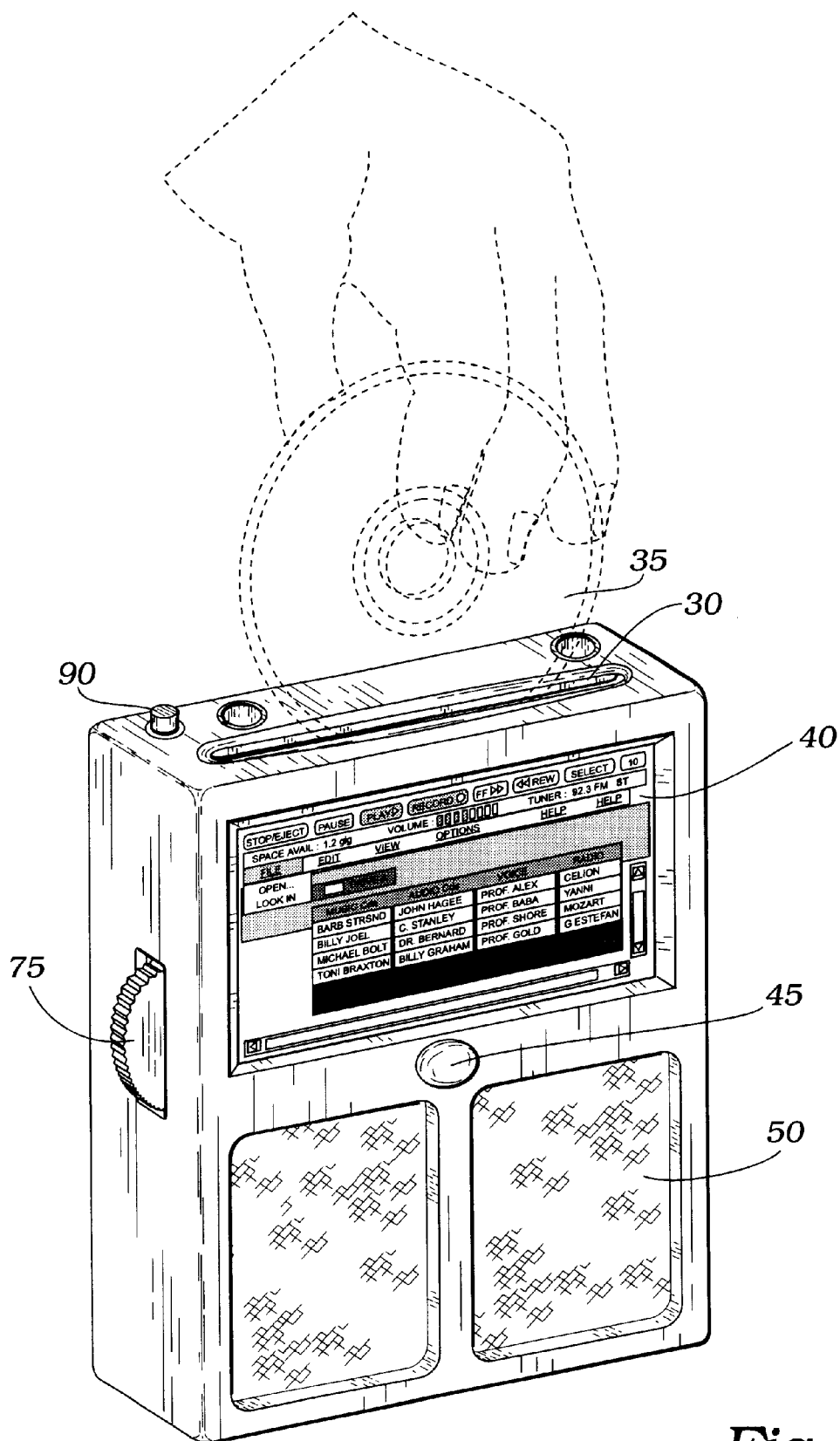
FIG. 2 is a further perspective view thereof showing further features thereof.
Figure 3:
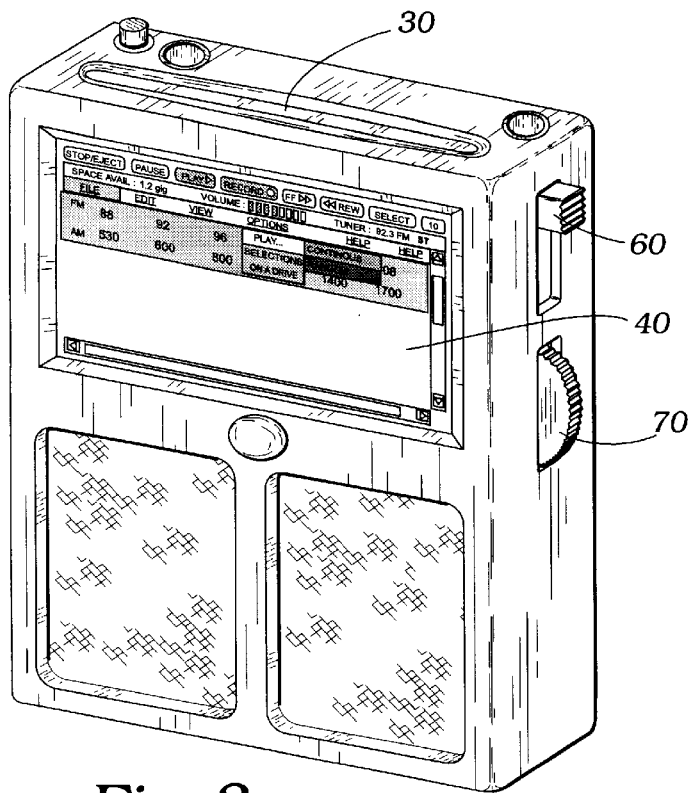
FIG. 3 is a block diagram of the elements of the apparatus and their relationship.
Figure 4:
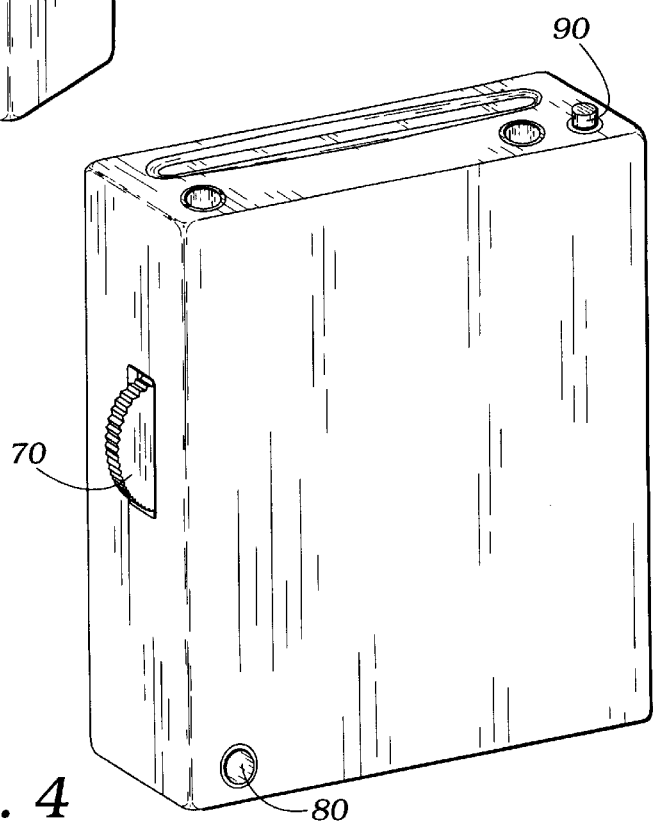
Figure 5:
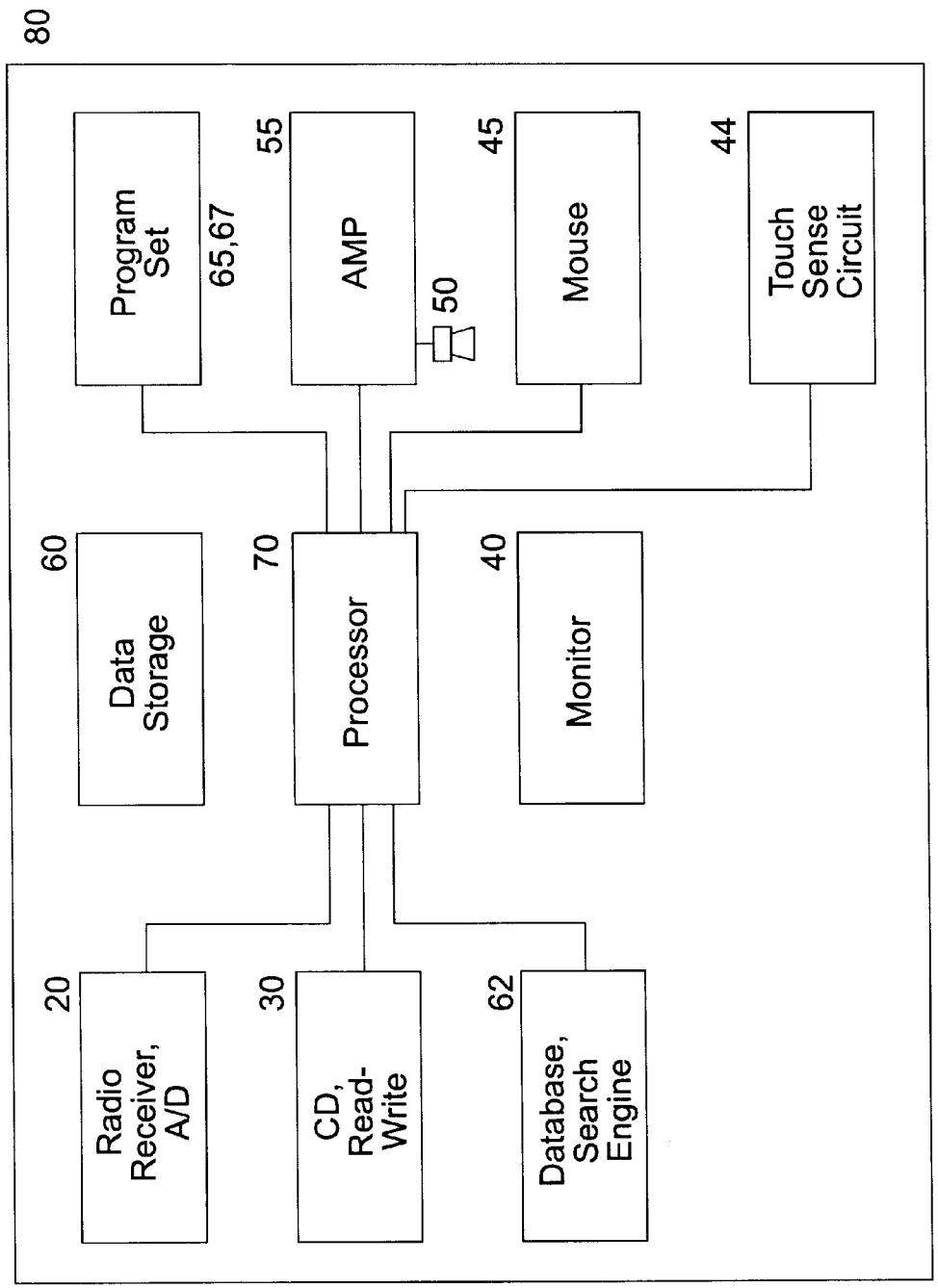

The above described drawing figures illustrate the invention, a portable entertainment apparatus 10 comprising: a means for receiving electromagnetic wave energy signals and for converting said signals into digital data signals 20 such as a common AM or FM radio receiver with an audio signal to digital signal converting circuit as is well known in the art; a means for digitally reading and writing 30 a compact disk 35, said means being of any well known design and which is currently commercially available in the consumer electronics field; a means for video information display and selection 40 such as a video monitor of the cathode ray tube, thin film transistor or liquid crystal types as combined with a touch sense screen 44 of any well known type or a cursor moving device 45 such as a mouse; a means for producing an audio output such as a pair of stereo loudspeakers 50 driven by an amplifier 55; a means for digital data storage 60 such as a magnetic domain storage hard drive or read-write compact disk read and write memory device or other memory device; a data processing program 65 such as a computer code set of instructions, the data processing program 65 being stored in the digital data storage means 60 or alternately in a solid state memory device such as a ROM chip set 67, well known in the art; a means for processing signals 70 in accordance with the data processing program 65 such as a digital data signal microprocessor and its related and associated circuit elements as found and used ubiquitously in the small computer field; the energy signals receiving means 20, compact disk reading and writing means 30, video information display and touch sense means 40, 44, audio output means 50, and data storage means 60 being interconnected with an electronic circuit 80 enabled for receiving, storing, organizing and outputting audio and video information in accordance with manual selections through the touch sense video information display and selection means 40 as guided by the data processing program 65. As shown in FIGS. 1 and 2 sockets 95 may be made available for a microphone for voice input or other audio source. Preferably, a touch sense keyboard 140 may be presented on the monitor 40 for manual input of titles under which recorded material may be saved.

Preferably, the energy signals receiving means 20 provides a collapsible radio antenna 90 so as to enable receiving of weak radio signals, and also preferably provides an ear phone 100 or head phone for transferring the audio output directly to one or both ears of the user of the apparatus so as to provide private listening and usage of the apparatus 10.

Preferably, the compact disk reading and writing means 30 provides a series of control function buttons 110. Such buttons may constitute real electrical switches or simulated switches for touch sense control. In either case, the selection of such buttons 110, interconnected through the electronic circuit 80, performs the CD related functions of respectively stopping play, ejecting a compact disk, pausing play, starting play, recording, selecting a track, fast forwarding, and rewinding which is equivalent to resetting.

An important feature of the apparatus is the data processing program 65 which is enabled for displaying a visual choice menu graphic on the video information display 40 for enabling selection of action options, the menu comprising a primary choice 120 of "FILE," "EDIT," "VIEW," "OPTIONS" and "HELP" selections. Secondary choices 130 under the "FILE" option are preferably: "SAVE AS," "OPEN" and "DELETE." Secondary choices under the "EDIT" option are preferably: "AUDIO," "RADIO," "VOICE" and "KEYBOARD." Secondary choices under the "VIEW" option are preferably: "DISC/TRACK INFO," and "STATUS BAR."

In use, the apparatus 10 may be tuned to a radio program or a CD track of an inserted CD 35 and the music or other audio material therefrom may be recorded permanently on the memory storage devices 60 of the apparatus. Such material may be identified in a custom manner, i.e., labeled as desired, and may be recalled at any later time for replay. In the event that one wishes to retrieve a particular selection, a data base with search capability 62 as represented by common software such as Microsoft® Access, is enabled within the present invention 10 for searching on single or multiple words or parts of words to retrieve such material without the necessity for recalling exact titles.

It is clear from the foregoing and more particularly, the apparatus is able to record information from four different sources. It can record music from compact discs 35. This is done when a CD is inserted into the CD slot 30 located on top of the apparatus 10. One can chose to listen to the CD 35 by selecting the PLAY button, or record all of the tracks or some of the tracks by pressing FILE, SAVE AS from the menu bar 120. Material may be recorded from the radio 20, CD player 30 or voice, the later through use of a microphone, by selecting PLAY and RECORD buttons. However, this button combination is not used to record music CD material, but instead these are recorded by selecting FILE and SAVE AS menu choices. A title may be provided for the recorded material and will be added to an index of a large number of possible recorded selections. An entire CD or only selections from a CD may be placed into a saved selection location. CD, radio and voice selections are stored in separate indexed locations and are later retrieved by selecting from one of the three indexes. Storage sites may be any one of the preloaded numerically identified locations, or alternately may be a specific name manually input through the keyboard 140 optionally. Preferably a hard drive, i.e., magnetic domain storage device may be used for setting-up and storing selections in organized, numerically identified locations. Also, a separate memory device, such as a read and write CD device may be used for random storage of selections with custom names. Both memory devices may be erased and rewritten as desired.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A portable entertainment apparatus comprising:
    a means for receiving electromagnetic wave energy signals and for converting said signals into digital data signals;
    a means for reading a compact disk;
    a touch sense screen means for video information display and selection using menu graphics;
    a means for producing an audio output;
    a read and write means for digital data storage using a compact disk;
    a data processing program, the data processing program stored in the digital data storage means;
    a means for processing signals in accordance with the data processing program;
    the energy signals receiving means, compact disk reading and writing means, touch sense means, audio output means, and data storage means interconnected with an electronic circuit enabled for receiving, storing, organizing and outputting audio and video information in accordance with manual selections through the touch sense video information display and selection means as guided by the data processing program;
    a touch sense keyboard is enabled by the monitor for manual input of titles under which recorded material may be saved; and
    a search capability is enabled for searching on single or multiple words or parts of words to retrieve said digital data without the necessity for recalling exact titles.

2. The apparatus of claim 1 wherein the compact disk reading and writing means provides a series of control function buttons, the buttons interconnected to the electronic circuit for performing the functions of stopping play, ejecting a compact disk, pausing play, starting play, recording, selecting a track, fast forwarding, and rewinding.

3. The apparatus of claim 1 further comprising a means for video information display and selection as a cursor moving device.

4. The apparatus of claim 1 wherein the data processing program provides a visual choice menu for selecting action options, the menu comprising a primary choice of "FILE," "EDIT," "VIEW," "OPTIONS" and "HELP" selections.

5. The apparatus of claim 4 wherein the data processing program provides a visual choice menu for selecting action options, the menu comprising a secondary choice under the "FILE" option of: "SAVE AS," "OPEN" and "DELETE."

6. The apparatus of claim 4 wherein the data processing program provides a visual choice menu for selecting action options, the menu comprising a secondary choice under the "EDIT" option of: "AUDIO," "RADIO," "VOICE" and "KEYBOARD."

7. The apparatus of claim 4 wherein the data processing program provides a visual choice menu for selecting action options, the menu comprising a secondary choice under the "VIEW" option of: "CD," "RADIO" and "VOICE."

* * * * *